Patented Dec. 11, 1928.

1,695,250

UNITED STATES PATENT OFFICE.

GEORGE O. CURME, JR., OF CHARLESTON, WEST VIRGINIA, ASSIGNOR TO CARBIDE AND CARBON CHEMICALS CORPORATION, A CORPORATION OF NEW YORK.

MANUFACTURE OF GLYCOLS.

No Drawing.   Application filed January 7, 1926.   Serial No. 79,895.

The invention is a process for the manufacture of olefine glycols from the corresponding chlorhydrins. Thus ethylene glycol, $C_2H_4(OH)_2$, is produced from ethylene chlorhydrin, $C_2H_4OHCl$.

In prior processes for making glycols from chlorhydrins the hydrolyzing agents employed have been very weak bases, such as sodium bicarbonate. Strong bases, such as the caustic alkalies, have been regarded as unsuitable because when they were used the chlorhydrin was largely converted into undesired products, including the corresponding olefine oxides. According to established procedure, however, when an olefine oxide was the desired product, a caustic alkali was used to decompose the chlorhydrin, the olefine oxide being obtained as a distillate from the reaction liquid.

For many reasons it is desirable in the manufacture of glycols to use a caustic alkali, such as caustic soda, instead of sodium bicarbonate. Such a substitution results in considerable economies. A caustic liquor can be economically produced by the electrolysis of brine, and if it can be used as it comes from the cells without separating its undecomposed salt and other impurities, it is a very cheap base as compared with the high-grade sodium bicarbonate of the ammonia-soda process. The advantages of using the caustic liquor as such instead of converting its content of hydroxide to bicarbonate is too obvious to require discussion. The object of the present invention is to provide a process for manufacturing glycols in which a caustic liquor, and preferably crude liquor from electrolytic cells, is used for the hydrolysis of chlorhydrins.

I have found that high yields of glycols can be obtained by hydrolyzing chlorhydrins with caustic if certain precautions are observed. The initial product of the reaction between the chlorhydrin and the alkali is evidently olefine oxide, and the velocity of this reaction increases with the concentration of the reacting materials, and with temperature. It is known that olefine oxides unite with water to form glycols, and since water is present this reaction will go on. There will be at all times a quantity of olefine oxide dissolved in the water present, and the reaction between the alkali and the chlorhydrin will tend to increase this quantity while the reaction between the olefine oxide and water will tend to diminish it. The velocity of the latter reaction also increases with the concentration of the reacting materials, and with temperature.

Even the more soluble of the olefine oxides are not very soluble in water, and if at any time the concentration of the oxide exceeds its solubility, some oxide will of course be vaporized and either lost to the process or recovered and converted into glycol with difficulty. It has been found that the reaction between the chlorhydrin and the caustic alkali proceeds more rapidly than that between the olefine oxide and the water, the tendency being for an excess of olefine oxide to build up in the aqueous solution. The sodium chloride present in the solution either from the reaction between chlorhydrin and caustic soda or from other sources somewhat accelerates the reaction between the olefine oxide and water but not enough to prevent the above mentioned tendency. It will be apparent that the problem of converting chlorhydrin into glycol involves a sufficiently complete decomposition of the chlorhydrin into olefine oxide; a sufficient rate of reaction between the oxide and water to permit the reaction to be substantially completed within a reasonable time; and the maintenance of the concentration of olefine oxide at a value not more than its solubility under the conditions of temperature and pressure prevailing.

The reaction between caustic alkalies and chlorhydrin proceeds at a much faster rate than the reaction between sodium bicarbonate and chlorhydrin. In prior unsuccessful attempts to make glycol I have treated chlorhydrin with caustic soda, but much olefine oxide was evolved from the solution and the yield of glycol was not over ten per cent of the theoretical. If the process has been tried by others, the result was probably the same, for the process has not been recommended. In view of my subsequent investigations I now apprehend that in the earlier unsuccessful experiments the reaction producing olefine oxide, promoted by the strong base and the high concentrations of reagents, and by the temperatures employed, proceeded too rapidly in view of the limited solubility of the olefine oxide under the prevailing conditions, and this brought about failure.

I have discovered that the inherent limitations of the process using caustic soda as the decomposing agent are not such as to preclude good yields of glycol with a reasonable reaction time. In other words, the reaction between water and olefine oxides, such as ethylene oxide, at temperatures between 50° C. and 100° C., proceeds at a sufficient rate, and the reaction producing olefine oxide can be so retarded that it will not outstrip the glycol-forming reaction; while the solubility of the olefine oxide can be increased if desired.

The solubility of the olefine oxide can be increased by maintaining super-atmospheric pressure on the reaction liquid; by lowering the temperature of the liquid; and, at least to some extent, by lowering the concentration of other substances dissolved in the liquid. An increase in the quantity of olefine oxide dissolved in the liquid will not retard the reaction which produces it, but will promote that which consumes it, in accordance with familiar mass action principles. Lowering the temperature will retard both of the reactions above referred to though not necessarily to the same extent. Reducing the concentration of alkali or chlorhydrin will retard the first reaction without directly affecting the second. It is obvious that with this number of variable factors it is impossible to give any statement of the necessary conditions which is at once comprehensive and detailed. Preferred conditions will be illustrated by an example and suitable conditions for any particular case can be readily ascertained from the foregoing discussion.

In a preferred adaptation of the invention a chlorhydrin solution containing 8 to 12% of ethylene chlorhydrin is treated in a pressure vessel with an excess of crude caustic liquor containing 10 to 12% NaOH and undecomposed salt. The chlorhydrin solution is held at a temperature in excess of 50° C., and preferably nearer 80° C., and the caustic liquor is added at such a rate that the pressure of ethylene oxide above the liquid does not exceed atmospheric pressure by more than a few pounds. This may require 8 to 12 hours. The mixture is then held at just below its boiling point for 3 to 4 hours longer. The yield of ethylene glycol is approximately 96% of the theoretical. Under the above conditions the final solution contains from 5% to 7% of glycol but this is not detrimental as the dilute glycol can be concentrated as easily as the solutions which are used in making it. The hot dilute glycol is preferably carried directly to an evaporator for concentration in order to utilize its heat.

The process is well adapted for continuous operation, the reacting materials being mixed and passed through a conduit in which they react, and being finally discharged into a continuous still. The moving stream of reaction mixture is preferably heated to progressively increasing temperatures and if desired excess pressure is easily maintained, permitting the temperature to be raised more rapidly and thereby expediting the process.

The various forms which the invention may take have the following features in common: A caustic alkali is caused to react upon a chlorhydrin in the presence of water under such conditions that the concentration of olefine oxide does not substantially exceed its solubility under the prevailing conditions. In order that the conversion of chlorhydrin to glycol may be complete within a reasonable time, the decomposition of the chlorhydrin should preferably go on at as high a rate as is consistent with the preceding condition. As the reaction rate falls off because of depletion of the reacting materials and accumulation of the products, an influence such as increased temperature is therefore caused to accelerate the reaction rate. It is my intention to cover in the appended claims all processes based on these principles.

The invention is applicable not only to single chlorhydrins but to mixtures of a plurality of these compounds as well.

I claim:

1. Process which comprises reacting with a caustic alkali on a quantity of chlorhydrin dissolved in water until the chlorhydin is substantially completely decomposed, and restricting the rate of reaction so that the major portion of the chlorhydrin is converted into glycol.

2. Process which comprises reacting with a caustic alkali on a quantity of chlorhydrin dissolved in water, and accelerating the rate of glycol formation by increasing the concentration of alkali metal chloride beyond that which results from said reaction.

3. The process of making glycols which comprises mixing a chlorhydrin with a caustic alkali and water at such concentrations and temperature that the chlorhydrin is decomposed without substantial vaporization of olefine oxide; holding the mixture at or below its original temperature until the chlorhydrin present is partially decomposed; and then heating the mixture to a temperature sufficient to accelerate the reaction but insufficient to cause substantial vaporization of olefine oxide.

4. The process of making glycols which comprises mixing a chlorhydrin with a crude caustic cell-liquor and water at such concentrations and temperature that the chlorhydrin is decomposed without substantial vaporization of olefine oxide; holding the mixture at or below its original temperature until the chlorhydrin present is partially decomposed; and then heating the mixture to a temperature sufficient to accelerate the reaction but insufficient to cause substantial vaporization of olefine oxide.

In testimony whereof, I affix my signature.

GEORGE O. CURME, Jr.